R. E. WILSON.
CAR BRAKE.
APPLICATION FILED FEB. 2, 1910.
981,963.
Patented Jan. 17, 1911.
2 SHEETS—SHEET 1.
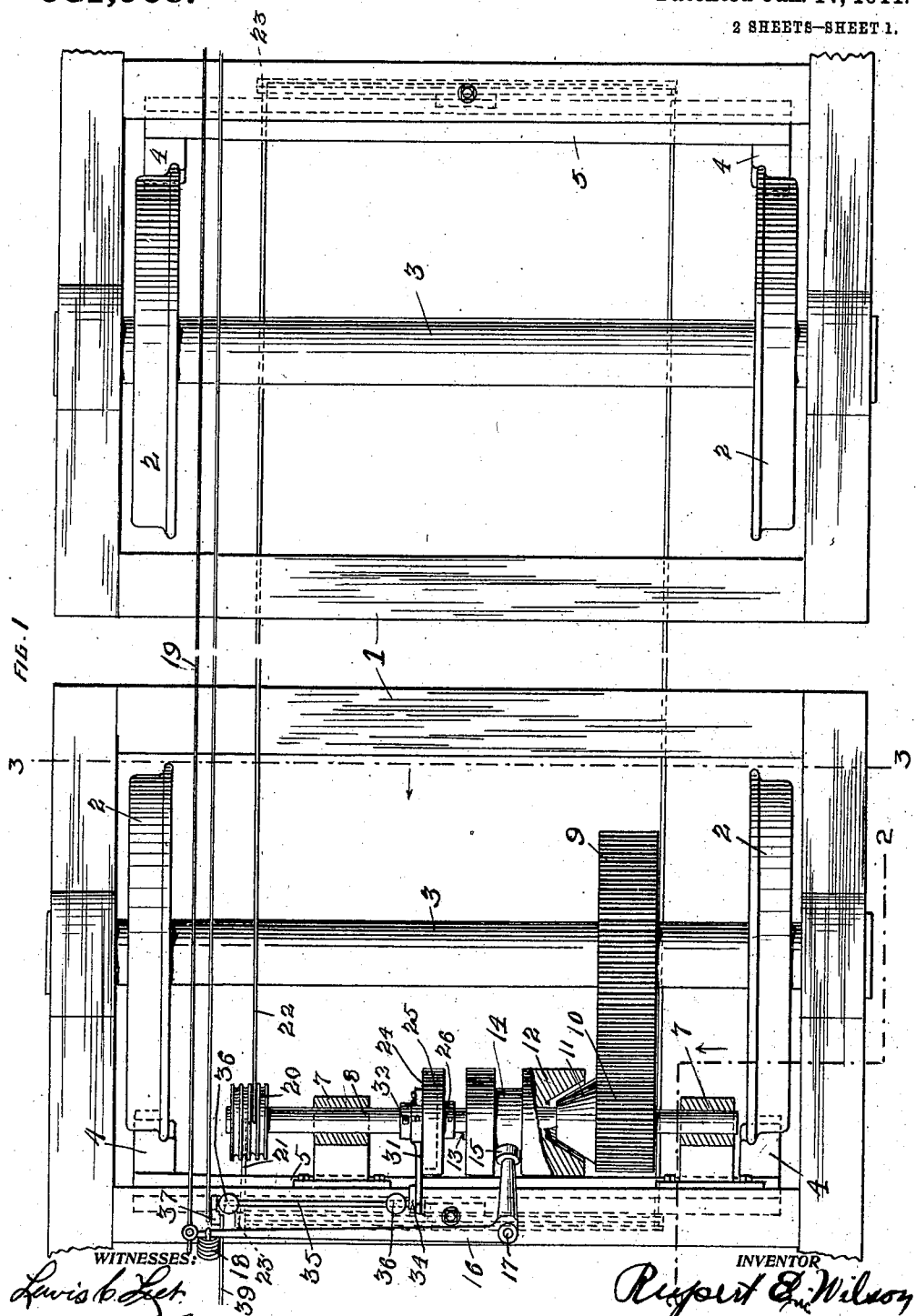

R. E. WILSON.
CAR BRAKE.
APPLICATION FILED FEB. 2, 1910.
981,963.
Patented Jan. 17, 1911.
2 SHEETS—SHEET 2.
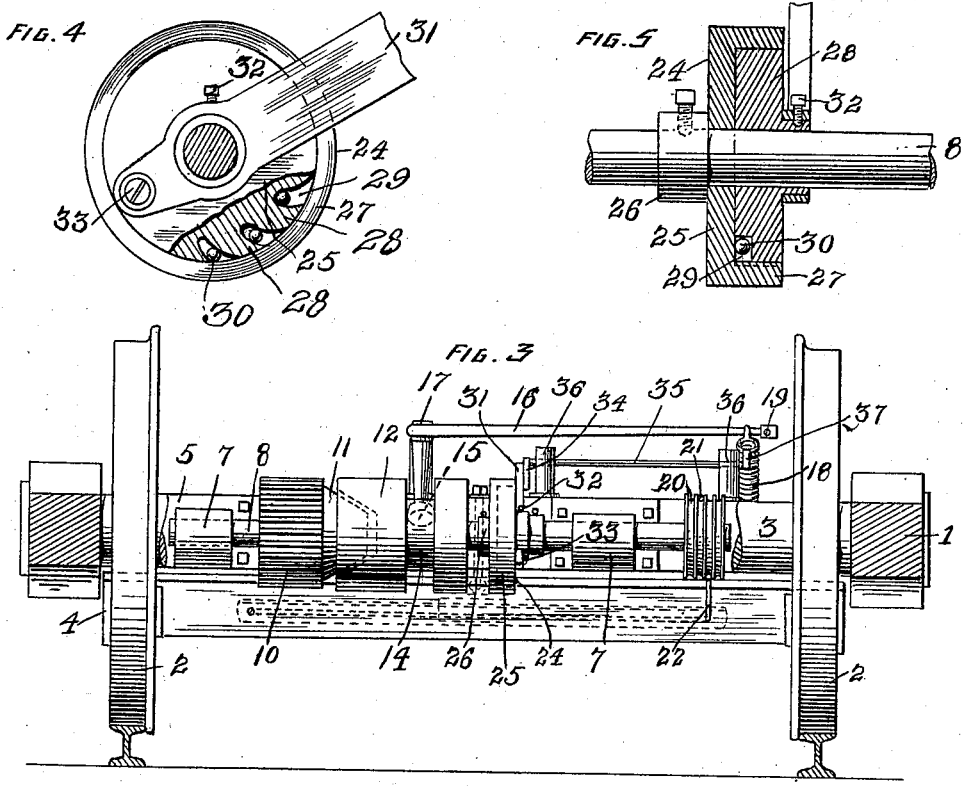
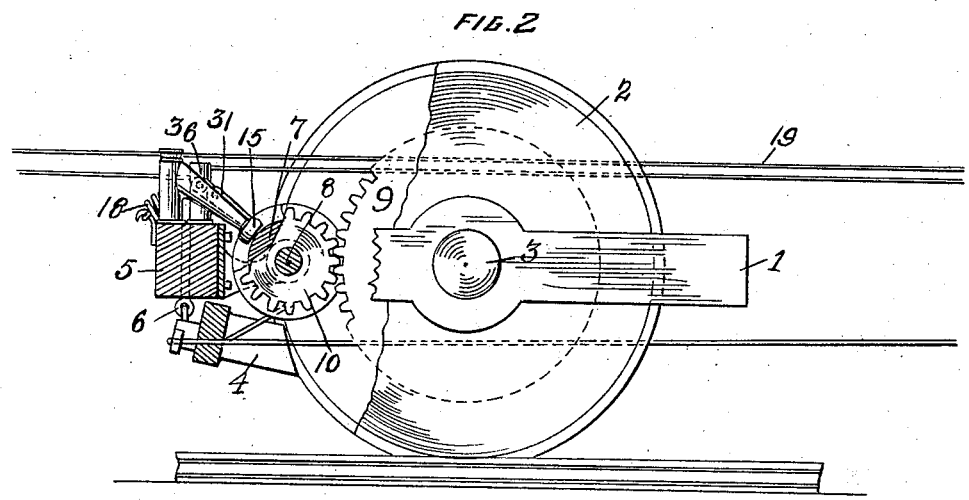
WITNESSES:
INVENTOR
Rupert Eric Wilson
BY
Watson E. Coleman
ATTORNEY

UNITED STATES PATENT OFFICE.

RUPERT ERIC WILSON, OF OAKLAND, CALIFORNIA, ASSIGNOR OF ONE-FOURTH TO CHRISTIAN A. LUKAS, OF SANTA ROSA, CALIFORNIA, AND ONE-FOURTH TO ADOLPH E. LUCAS, OF OAKLAND, CALIFORNIA.

CAR-BRAKE.

981,963.

Specification of Letters Patent.  Patented Jan. 17, 1911.

Application filed February 2, 1910. Serial No. 541,519.

*To all whom it may concern:*

Be it known that I, RUPERT ERIC WILSON, a citizen of the United States, residing at Oakland, in the county of Alameda and State of California, have invented certain new and useful Improvements in Car-Brakes, of which the following is a specification, reference being had to the accompanying drawings.
My invention relates to improvements in car brakes, and more particularly one operated by power derived from the axles of the car when in motion and controlled by levers or other devices operated by the motorman.
The object of the invention is to provide a car or vehicle brake of this character which will be simple in construction, powerful and efficient in operation, and easy to control and manipulate.
With the above and other objects in view, the invention consists of the novel construction, combination and arrangement of parts, hereinafter fully described and claimed, and illustrated in the accompanying drawings in which:—

Figure 1 is a plan view partly in section and a portion of a car showing my improved brake applied thereto; Fig. 2 is a detail longitudinal section taken on the plane indicated by the line 2—2 in Fig. 1; Fig. 3 is a vertical transverse section taken on the plane indicated by the line 3—3 in Fig. 1; and Figs. 4 and 5 are detail views showing the construction of the retaining clutch.
Referring more particularly to the drawings, 1 denotes portions of a car or other vehicle to which my improved brake is applied, 2 denotes the track wheels and 3 the axles. The wheels 2 are adapted to be engaged by brake shoes 4 on the ends of transverse brake beams 5 which are loosely hung by link connections 6 from the parts 1. This brake mechanism is of ordinary construction and forms no part of the present invention since any suitable mechanism of this character may be employed in lieu of the one disclosed.

In practicing my invention I provide suitable bearings or hangers 7 for a transverse shaft 8 which is disposed parallel with one of the axles 3 and is adapted to be actuated from the same by any suitable driving means, the one illustrated consisting of a tooth gear 9 fixed to the axle 3 and meshing with a pinion 10 which is loosely arranged on the shaft 8 and is adapted to be connected thereto by a suitable clutch. The latter preferably comprises a friction cone clutch member 11 fixed to the pinion 10 or to the shaft 8 and adapted to be engaged by a coacting clutch member 12 which has a cone socket to receive the cone 11 and which is slidably but non-rotatably arranged on the shaft 8, a longitudinal key 13 being preferably employed for preventing rotary movement of the member 12.

Formed in the clutch member 12 is an annular groove 14 for the reception of an anti-friction roller 15 on one arm of a bell crank lever 16 fulcrumed at its angle on a vertical pivot 17. The long arm of the lever has connected to it a coil spring 18 which tends to cause it to move the clutch member 12 to retracted position, and also connected to the long arm of the bell crank or lever 16 is an operating element 19 adapted to be operatively connected to a lever or any other actuating device under the control of the motorman.

Fixed to the shaft 8 is a winding drum 20 to which are attached at opposite points the ends of two cords, cables or other flexible elements 21, 22, which latter extend in opposite directions and are operatively connected to the brake beams 5, as shown at 23, so that when the shaft 8 is rotated to wind the cables thereon the brake shoes 4 will be moved into frictional engagement with the car wheels 2.

While the preferred manner of operating the brake beams has been shown I wish it understood that any other suitable operating mechanism may be substituted.

For the purpose of holding the brakes applied and relieving the clutch members 11, 12, from undue wear, I employ a retaining clutch which may be of any suitable or preferred form and construction. The clutch illustrated in Figs. 4 and 5 is preferably employed and it comprises an outer member 24 consisting of a circular plate 25 having a hub portion 26 fixed to the shaft 8 and an annular flange or rim portion 27. This retaining clutch also comprises an inner member 28 in the form of a circular disk or plate loosely arranged on the shaft 8 and within the outer member 24 and having on the lower portion of one side of its periphery a plurality of pockets or seats 29 for clutch balls or spheres 30, see Fig. 4. The member 28 has a hub portion to enter the eye or opening in a lever 31, which latter is fixed to said member by a set screw 32 arranged in its eye, and also by a screw 33 which passes transversely through its short end and into the member 28. The long arm of the lever 31 may be actuated by any suitable means under the control of the motorman of the car, but as illustrated it has a loose connection with a crank arm 34 on a rock shaft 35 arranged in bearing posts 36. On the other end of the rock shaft 35 is a crank arm 37 to which is connected an operating element 39 adapted to be operated and controlled by suitable means within reach.

The operation of the invention is as follows: Assuming the car to be traveling in the direction of the arrow A, Fig. 1, the gears 9, 10 will cause the cone 11 to be constantly rotated, said cone being loose on the shaft 8 which latter is normally quiet. When the motorman desires to apply the brakes he actuates the element 19 so that the lever or bell crank 16 will shift the cone socket member 12 into frictional engagement with the rotating cone 11, and since the member 12 is keyed to the shaft 8, the latter will be rotated in a direction to cause the brake operating cables 22 to be wound on the drum or windlass 20, the brakes being thus applied. After the cables 22 have been wound on the windlass to a predetermined extent, the cone 11 will slip within the cone socket member 12, and in order to maintain the brake in applied position without maintaining the parts 11, 12 in frictional contact, the retaining clutch is employed. This clutch is operated by the motorman when he actuates the element 39 to cause the shaft 35 to be rocked. The rocking movement of the shaft 35 is imparted to the lever 31, the latter being thereby swung in a downward direction to cause the balls 30 to be thrown from inoperative positions in the bottoms of the pockets to operative positions in which said balls will be wedged between the walls of their pockets and the inner face of the flange 27 of the outer member of the retaining clutch. Said outer member of the retaining clutch which is fixed to the shaft 8 will be thereby locked to the inner member carrying the lever 31, so that the shaft will be held stationary to maintain the cables 22 wound up on the windlass 20. When this retaining clutch is thus rendered effective, the cone clutch member 12 may be disengaged from the cone 11 without releasing the brakes. When it is desired to release the brakes, the element 39 is operated in the other direction to cause the lever 31 to be swung in an upward direction, thereby causing the friction balls 30 to drop back into the bottom of the pockets or seats as shown in Fig. 4. When the balls are thus in inoperative positions, the outer member of the retaining clutch will be released so that the brake shoes will drop from contact with the brake wheels and the cable 22 will be thereby unwound from the windlass 20.

From the foregoing it is thought that the construction, operation and advantages of the invention will be readily understood without a more detailed explanation. It will also be understood that various changes in the form, proportion and arrangement of parts, and in the details of construction, may be resorted to within the spirit and scope of the invention.

Having thus described the invention, what is claimed is:

1. In a brake, the combination with a wheel axle and a brake mechanism, of a rotatably mounted shaft, means actuated by the latter for controlling the brake mechanism, a rotatable friction member on said shaft and driven from the wheel axle, a coacting friction member slidably but non-rotatably mounted on said shaft, means for shifting the last mentioned friction member into engagement with the first mentioned friction member, whereby the movement of the latter will be imparted to the shaft to cause the brake mechanism to be actuated, and a retaining clutch for said shaft and independent of the two friction members, whereby the shaft may be held against movement to retain the brake mechanism in applied position after the co-acting friction members are disengaged.

2. In a brake, the combination with a wheel axle and a brake mechanism, of a rotatably mounted shaft, means actuated by the latter for controlling the brake mechanism, a rotatable friction member on said shaft and driven from the wheel axle, a coacting friction member slidably but non-rotatably mounted on said shaft, a lever for shifting the last mentioned friction member into engagement with the second mentioned friction member, a spring for retracting said second mentioned friction member, and a retaining clutch for said shaft and independent of said friction members, whereby the shaft may be held stationary to retain the brake mechanism in applied position after the co-acting friction members are separated.

3. In a brake, the combination with a wheel axle and a brake mechanism, of a rotatably mounted shaft, means actuated by the latter for controlling the brake mechanism, a rotatable friction member on said shaft and driven from the wheel axle, a coacting friction member slidably but non-rotatably mounted on said shaft, a lever for shifting the last mentioned friction member into engagement with the second mentioned friction member, a spring for retracting said second mentioned friction member, a retaining clutch for said shaft consisting of an outer member fixed to the shaft, an inner socketed member loose on the shaft, and clutch balls in the sockets of the last mentioned member, a lever fixed to the inner socketed member, a rock shaft, an arm on the latter operatively connected to said lever, and means for rocking said shaft.

4. In a brake, the combination with a wheel axle and a brake mechanism, of a shaft, means actuated by the latter for controlling the brake mechanism, a gear fixed to the axle, a pinion loose on said shaft and in mesh with said gear, a friction clutch having one member fixed to said pinion, and its other end slidably but non-rotatably arranged on said shaft, a lever for shifting said slidable clutch member, a spring for actuating said lever in one direction, an operating element for actuating the lever in the other direction, and a retaining clutch for said shaft.

5. In a brake, the combination with a wheel axle and a brake mechanism, of a shaft, means actuated by the latter for controlling the brake mechanism, a gear fixed to the axle, a pinion loose on said shaft and in mesh with said gear, a friction clutch having one member fixed to said pinion, and its other end slidably but non-rotatably arranged on said shaft, means for shifting said slidable clutch member, a retaining clutch for said shaft consisting of an outer member fixed to the shaft, an inner socketed member loose on the shaft, clutch balls in the sockets of the last mentioned member, a lever fixed to the last mentioned member, a rock-shaft, an arm upon the latter operatively connected to said lever, and means for rocking said rock shaft.

6. In a brake, the combination with an axle and a brake mechanism, the latter including movable brake beams, of a shaft, a winding drum upon the latter, cables attached to said drum and operatively connected to the brake beams, meshing gears on the axle and shaft, a friction clutch having one member fixed to the gear on the shaft, and its other member slidably but non-rotatably arranged on said shaft, a spring-actuated lever for shifting the slidable clutch member, an operating element connected to said lever, a retaining clutch for said shaft, and means for actuating said clutch.

In testimony whereof I hereunto affix my signature in the presence of two witnesses.

RUPERT ERIC WILSON.

Witnesses:
HOWARD J. PEIRSOL,
L. C. LEET.